Nov. 26, 1935.　　C. E. SKELTON　　2,022,549
BUSHING PULLER
Filed June 21, 1934　　2 Sheets-Sheet 1
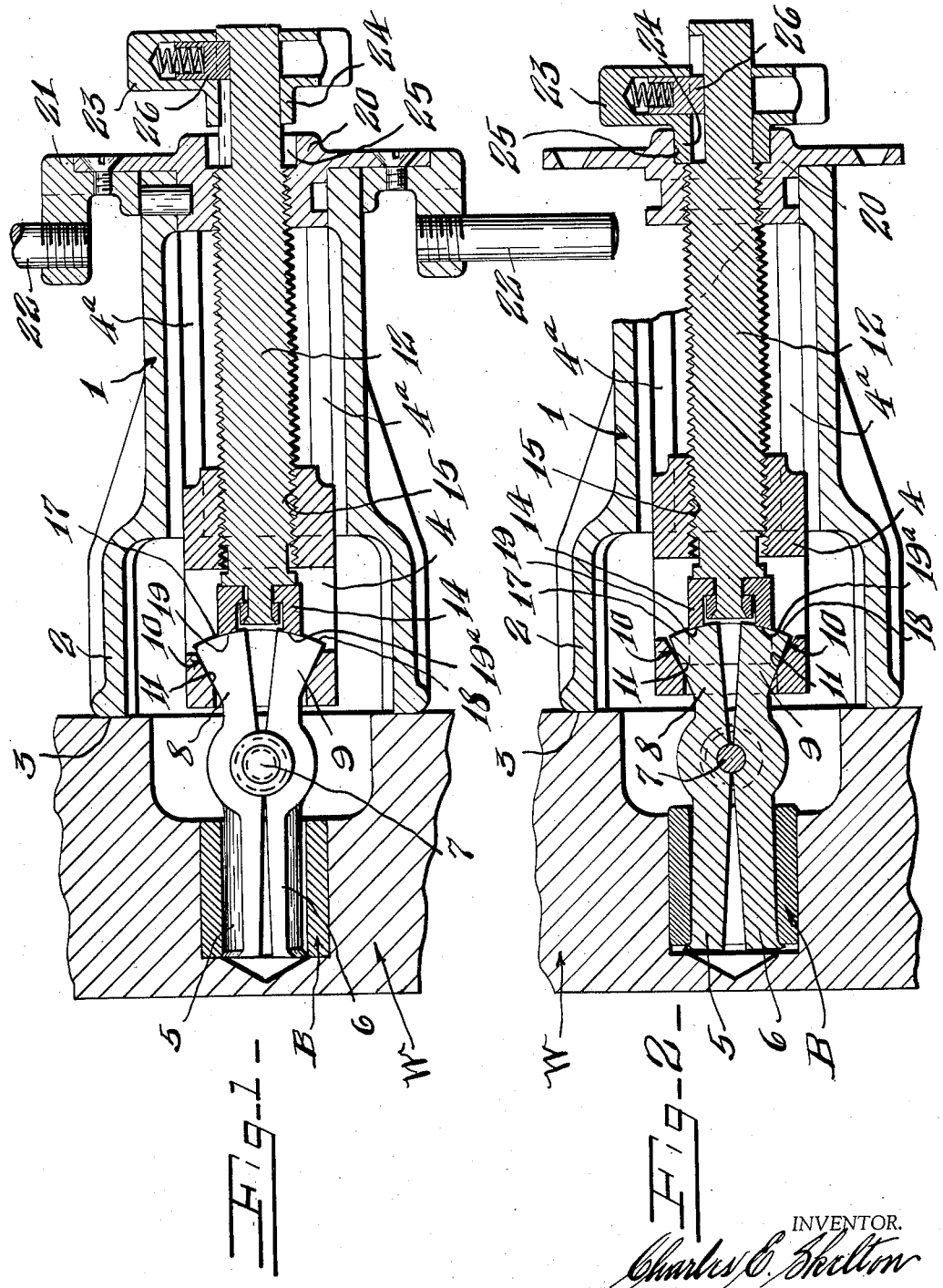
INVENTOR.
Charles E. Skelton
BY
ATTORNEYS.

Nov. 26, 1935.  C. E. SKELTON  2,022,549
BUSHING PULLER
Filed June 21, 1934   2 Sheets-Sheet 2
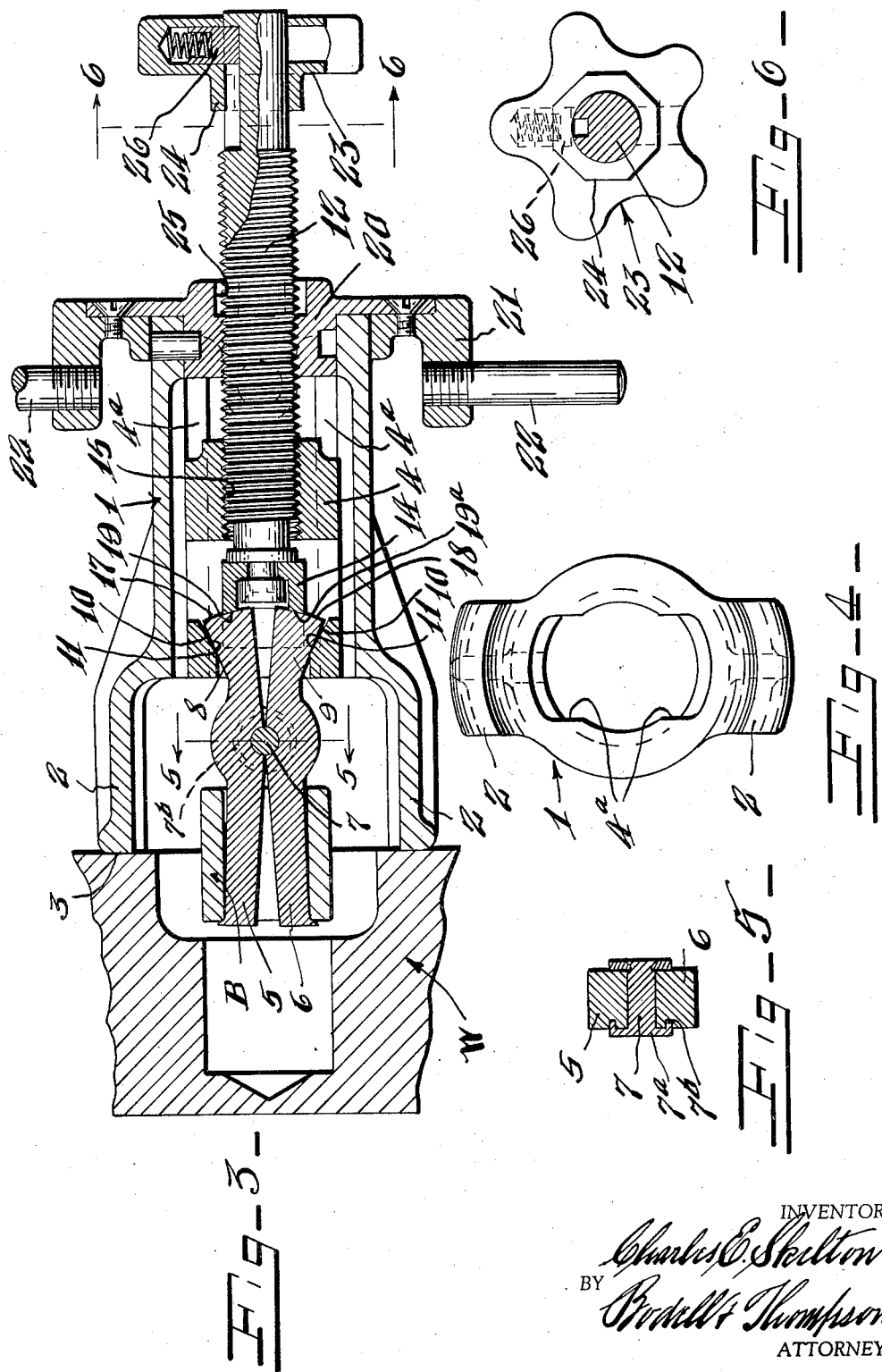
INVENTOR.
Charles E. Skelton
BY
Bodell & Thompson
ATTORNEYS.

Patented Nov. 26, 1935

2,022,549

UNITED STATES PATENT OFFICE 2,022,549

BUSHING PULLER

Charles E. Skelton, Syracuse, N. Y., assignor to Ira Saks, Cleveland, Ohio

Application June 21, 1934, Serial No. 731,702

8 Claims. (Cl. 29—88.2)

This invention relates to tools for pulling bushings, and similar articles, out of the holes, or bores, in which they are fixed, as for instance, pulling the bushings of the fly wheels of internal combustion engines out of the axial opening of the fly wheel, and has for its general object, a bushing puller which is particularly simple and economical to manufacture, consists of few parts, readily operable and highly efficient in use.

It further has for its object, a bushing puller in which a single feed screw is used to expand and contract expander jaws which grip the bushing and to move the jaws when expanded to pull the bushing.

It further has for its object, a bushing puller including a feed screw having means for selectively turning it, and to move it endwise without turning to fix the expander or jaws in the bushing and to move them bodily, when expanded, to pull the bushing or jaws into the bushing, said means being operable to couple the screw to a rotating member through which the screw threads and which, when so coupled and said member rotated, rotates said member without endwise movement, causing a pulling effect to be transferred to the expander or jaws.

The invention consists in the novel features and in the combinations and constructions hereinafter set forth and claimed.

In describing this invention, reference is had to the accompanying drawings in which like characters designate corresponding parts in all the views.

Figures 1, 2, and 3, are longitudinal, sectional views of this bushing puller, and contiguous parts of the bushing, and the parts from which it is being pulled, Figure 1 showing the bushing puller when first applied, Figure 2 showing the operation when the expanders are gripped to the bushing, and Figure 3 showing the pulling out operation.

Figure 4 is an end view of the carriage.

Figures 5 and 6 are detail sectional views on lines 5—5 and 6—6, Figure 3.

This bushing puller comprises, generally, a body having a face for thrusting against the part, as a fly wheel, from which the bushing is to be pulled, a carriage slidable along the body, expander or gripping means, as a pair of jaws, carried by the body and projecting beyond said face for entering the bushing, and being movable relative to the carriage, or having an expanding and contracting action to grip and release the bushing, and means, as a feed screw, selectively operable to rotate or to move endwise without rotation. The rotating movement expands the gripping means, or releases the gripping means in accordance with the direction of rotation. The endwise movement of the screw moves the carriage and the gripper jaws therewith, as a unit, to pull the bushing or to initially locate the carriage with gripper jaws in the bushing. Endwise movement also causes the carriage to react on the gripper jaws to tighten their gripping engagement or hold on the bushing. This tool is called a bushing puller for convenience, but obviously may be used for pulling other articles.

1 designates the body which is here shown as tubular in form and having an enlarged hollow head 2 at one end provided with a bearing face 3 for thrusting against the face of a part, as a fly wheel W from which the bushing B is to be pulled.

4 is a carriage mounted in the tubular body to slide lengthwise thereof and being held from rotatable movement, the carriage projecting into the hollow head. The body is formed with suitable guide ways 4ª along which the carriage slides.

The gripping means is here shown as a pair of expanding jaws 5, 6, pivoted together at 7, and having tail portions 8, 9, extending into the carriage, these tail portions 8, 9, and carriage having coacting cam or wedge faces 10 and 11 so arranged that when the jaws 5, 6, are thrust outwardly from the carriage, the cam faces coact to move the tail pieces inwardly, and to expand the jaw portions 5, 6, outwardly to grip the bushing. When the cam faces are released, the jaws 5, 6, are free to contract and release their grip from the bushing.

The jaws 5, 6, are duplicates and each formed with a bore semi-circular in cross section for fulcruming on the pivot, and the pivot 7 is formed with a head 7ª having an annular flange 7ᵇ fitting in semi-circular grooves in the jaws. The head with the flange holds the jaws assembled.

12 designates the feed screw extending lengthwise of the body and having a threaded engagement at 15 with the carriage, and also being swiveled within the carriage to a push block 14 thrusting against the end faces of the tail pieces 8 and 9, the coacting faces 17 and 18 of the tail pieces and the faces 19 and 19ª of the block 14 being arcuate in order that the end faces on the tail pieces may be slid on the block during the expanding action of the jaws 5, 6, when the tail pieces are being thrust to cause the cam faces 10 and 11 to coact.

The screw 12 also threads at the outer end of the body 1 through a threaded nut member 20 rotatably mounted in the body and held from endwise movement, this nut member having a web or wheel portion 21 to which is attached radial handles 22 for the purpose of giving a powerful turning movement to the nut to draw the screw endwise without turning. The screw 12 projects beyond the outer end of the body, and is provided with a knob or handle 23 for turning the screw relatively to the threaded member or nut 20, and independently thereof. This knob or handle 23 is keyed to the screw to turn therewith, and also is shiftable axially of the screw to couple it to the wheel or nut 20 so that it will turn, as a unit, therewith. As here shown, the handle or knob 23 is formed with a non-circular or octagonal hub 24, for entering a correspondingly shaped socket 25 in the threaded or nut member 20. The handle or knob is keyed to the screw by a spring pressed key 26 interfitting in a keyway in the screw. The spring pressure on the key tends to hold the knob in either of its shifted positions.

The tool here shown is adapted to pull a certain length bushing, or the jaws 5, 6 are adapted to extend through the bushing and hook on the inner end face thereof, but it may be used to extend only part way into the bushing, when the jaws are not long enough to extend through the bushing.

In operation, the tool shown in the drawings, is located so that the jaws 5, 6 extend loosely through the bushing. This is accomplished by turning the hand wheel 21 when uncoupled from the screw 12 in one direction with the face 3 opposed to the fly wheel, as shown in Figure 1. The handle or knob 23 then is turned to turn the screw 12 relatively to the nut 20 causing the screw to move endwise in the carriage or slide 4 and turn in the carriage 4, and thrust the block 14 against the tail pieces 8, 9, of the jaws 5, 6, causing the cam faces 10 and 11 to coact, and expand the jaws 5, 6. The handle 23 is then shifted until the hub 24 is in the socket 25 whereupon the wheel 21 is then turned by means of the handles 22. This first causes a further expansion of the jaws 5, 6, to bind them in firm engagement with the bushing, due to a sliding movement of the carriage 4 away from the jaws, while the screw is held from endwise movement, as shown in Figure 2. The handle 23 is then uncoupled from the wheel 21, and further turning of the hand wheel 21 moves the screw endwise without turning and slides the carriage 4, this dislodging the bushing, as shown in Figure 3. When the bushing is thus dislodged or pulled, the handle 23 is then, while uncoupled from the hand wheel, turned in a retrograde direction to withdraw the block 14 from the tail pieces, permitting the jaws 5, 6, to contract.

What I claim is:

1. A bushing puller comprising a body having a face for thrusting against the part from which the bushing is to be pulled, and also having guides extending lengthwise thereof, a carriage movable along the body and having means slidable along the guides and holding the carriage from turning, gripping means supported by the carriage and extending beyond said face for entering the bushing, and being movable relative to the carriage to grip the bushing, and operating mechanism for operating the gripping means relative to the carriage and moving the carriage, and bushing gripping means carried thereby, as a unit, along the body, said operating mechanism including a single feed screw threading in the carriage, means for selectively turning the screw, and moving it endwise, without turning, and means operated by the turning of the screw to operate the gripping means.

2. A bushing puller comprising a body having a face for thrusting against the part from which the bushing is to be pulled, a carriage movable along the body, bushing gripping means supported by the carriage and extending beyond said face for entering the bushing and movable relative to the carriage for gripping the bushing, a feed screw threading in the carriage, a threaded nut member mounted in the body and rotatable relatively thereto and in which the screw threads, means for turning the screw in said member, whereby upon turning of the screw, the screw is moved endwise, means for turning the nut member about the screw to move the screw endwise without turning, means operable to lock the screw to said member whereby upon turning of the member the screw turns, as a unit, therewith, and turns in the carriage, and means operated by the rotatable movement of the screw for effecting the operation of the gripping means to cause the same to grip the bushing when the screw is turned in one direction, and to release the bushing when the screw is turned in the opposite direction.

3. A bushing puller comprising a body having a face for thrusting against the part from which the bushing is to be pulled, a carriage movable along the body, bushing gripping means supported by the carriage and extending beyond said face for entering the bushing, and being operable relative to the carriage to grip and release the bushing, a threaded nut member rotatably mounted in the body and held from axial movement, and means for rotating the nut member, a screw threading through said nut member and also threading into the carriage, means for turning the screw relative to said nut member, whereby the rotation of the screw causes the screw to move endwise relative to the carriage, and operable to couple the same to said nut member, whereby the nut member and screw rotate as a unit when the nut member is rotated, and means operated by the endwise movement relative to the carriage to operate the gripping means.

4. A bushing puller comprising a body having a face for thrusting against the part from which the bushing is to be pulled, a carriage movable along the body, expander means supported by the carriage and extending beyond said face for entering the bushing, and having an expanding and contracting action relative to the carriage to grip and release the bushing, a screw threading in the carriage, and means for selectively turning the screw to effect an endwise movement thereof relative to the body and the carriage during the turning movement, and to move the screw endwise, without turning, and means supported by the carriage and coacting with the expanding means to operate the same during the turning movement of the screw relative to the carriage.

5. A bushing puller comprising a body having a face for thrusting against the part from which the bushing is to be pulled, a carriage movable along the body, a pair of jaws pivoted together and having tail pieces extending into the carriage, the carriage and tail pieces having coacting wedge faces arranged so that relative endwise movement of the jaws and carriage causes said faces to coact and effect pivotal movement of the jaws, and means for moving the carriage and parts carried thereby along the body, and for effecting pivotal movement of the jaws.

6. A bushing puller comprising a body having a face for thrusting against the part from which the bushing is to be pulled, a carriage movable along the body, a pair of jaws pivoted together and having tail pieces extending into the carriage, the carriage and tail pieces having coacting wedge faces arranged so that relative endwise movement of the jaws and carriage causes said faces to coact and effect pivotal movement of the jaws, a screw threading in the carriage, a thrust block on the end of the screw within the carriage and thrusting against the tail pieces, and means for selectively turning the screw and moving the screw endwise, without turning.

7. A bushing puller comprising a body having a face for thrusting against the part from which the bushing is to be pulled, a carriage movable along the body, a pair of jaws pivoted together and having tail pieces extending into the carriage, the carriage and tail pieces having coacting wedge faces arranged so that relative endwise movement of the jaws and carriage causes said faces to coact and effect pivotal movement of the jaws, a screw threading in the carriage, a thrust block on the end of the screw within the carriage and thrusting against the tail pieces, a nut member rotatably mounted in the body held from axial movement and through which the screw threads, means for turning the nut member about the screw and thereby move the screw endwise without turning, and means for turning the screw relative to the nut member and the carriage.

8. A bushing puller comprising a body having a face for thrusting against the part from which the bushing is to be pulled, a carriage movable along the body, a pair of jaws pivoted together and having tail pieces extending into the carriage, the carriage and tail pieces having coacting wedge faces arranged so that relative endwise movement of the jaws and carriage causes said faces to coact and effect pivotal movement of the jaws, a screw threading in the carriage, a thrust block on the end of the screw within the carriage and thrusting against the tail pieces, a nut member rotatably mounted in the body held from axial movement and through which the screw threads, means for turning the nut member about the screw and thereby move the screw endwise without turning, and means for turning the screw relative to the nut member and the carriage, and for coupling and uncoupling the screw and the nut member.

CHARLES E. SKELTON.